Nov. 28, 1944.　　　　G. H. ERB　　　　2,363,720
STOKER CONTROL AND CIRCUIT
Filed Feb. 14, 1940　　　　2 Sheets-Sheet 1

INVENTOR:
GEORGE H. ERB,
By Laurence Wingland
ATTORNEY.

Nov. 28, 1944.　　　　G. H. ERB　　　　2,363,720
STOKER CONTROL AND CIRCUIT
Filed Feb. 14, 1940　　　2 Sheets-Sheet 2

INVENTOR:
GEORGE H. ERB,
B. Lawrence C. Kingsland
ATTORNEY.

Patented Nov. 28, 1944

2,363,720

UNITED STATES PATENT OFFICE 2,363,720

STOKER CONTROL AND CIRCUIT

George H. Erb, East Orange, N. J., assignor to Automatic Control Corporation, St. Louis, Mo., a corporation of Delaware Application February 14, 1940, Serial No. 318,966

14 Claims. (Cl. 236—46)

The present invention relates to a stoker control circuit and mechanism therefor. More specifically, it relates to a stoker control wherein there is normally provided a constant operation of the stoker motor and with means varying the quantity of fuel or air supplied, so as to change the rate of burning the fuel. Means are also provided automatically to stop the stoker in response to certain room temperature conditions, and then to restart it when the conditions are normal.

An object of the invention is to provide a stoker control giving a constant stoker operation subject to modulation.

An additional object of the invention is to provide such a control in combination with an additional automatic temperature operating means to cause the stoker to stop and start in response to abnormal and normal room temperatures, respectively.

A further object of the invention is to provide a control of a heat-change unit having one stage in which there is a constant operation of the heat-change unit, preferably subject to modulation; and a second stage wherein there is only intermittent operation of the heat-change unit, so that, if there exists an extreme room temperature condition, there will be an automatic shift to intermittent operation.

Figure 1:
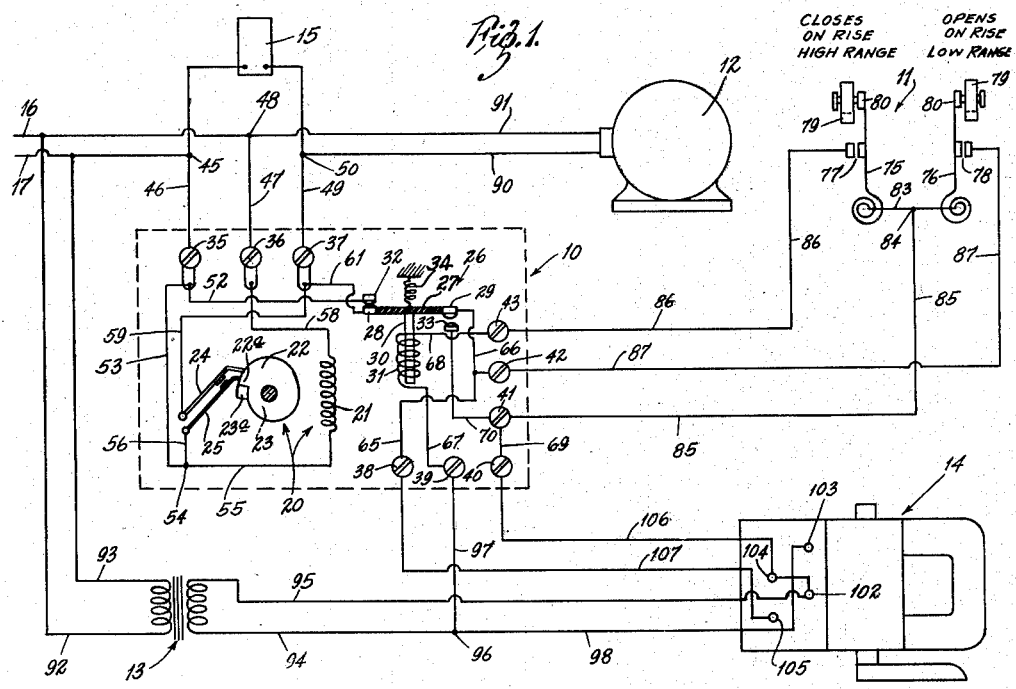
Fig. 1 is a view of the mechanism connected for complete operation.

The mechanism embodies generally a main control unit 10, a double room or space thermostat 11, a stoker motor 12 that may exemplify a unit employed for operation of a heat-change device, a transformer 13, a control motor unit 14, and a low limit control thermal switch 15. There are also power lines 16 and 17.

The main control unit includes a clock motor 20 having a winding 21 and jointly acting cams 22 and 23 on the motor shaft, one beside the other, and having lobes 22a and 23a, respectively, for operation of switch blades 24 and 25. The cams are shown as rotating clockwise, with the lobe 22a releasing its blade 24 prior to release by the lobe 23a of its blade 25.

When both cam lobes are in engagement with the blades 24 and 25, as in Fig. 1, the blade 25 is in an outward position, but the blade 24 is also in an outward position, and no contact results. When the cam lobe 22a releases the blade 24, the latter assumes an inward position, the blade 25 remaining held in an outward position by the cam lobe 23a, and contact results. Subsequently, when the lobe 23a releases the blade 25, it moves inwardly, whereupon it parts from the blade 24, opening the contacts. In completing the cycle, both blades move outwardly together, to return to the position of Fig. 1. Thus, the contacts are closed only for the time the blade 24 is inward and the blade 25 outward, an interval determined by the amount of overlap of the cam lobes.

The cams are adjustable on the shaft, to permit adjustment of the interval of closure. To insure that the blades do not close at other times during the cycle, when adjustment is made, it is only necessary to have the rise of the cam lobe 22a sufficiently early relative to the lobe 23a that the lobe 23a does not bring the blade 25 to the position of the blade 24 before the blade 24 has moved outwardly from such position.

In the unit there is also a relay generally indicated at 26 having an armature bar 27 of insulating material carrying contacts 28 and 29. The bar is attached to an armature 30, controlled by a coil 31. The armature is normally in position to cause engagement of the contact 28 with a fixed contact 32, but, upon energization of the coil 31, the armature is moved to shift the bar 27, breaking contacts 28 and 32 and closing the contact 29 with a fixed contact 33.

This unit 10 also includes main terminals 35, 36 and 37, and subsidiary terminals 38, 39, 40, 41, 42 and 43. The terminal 35 is connected at 45 by the line 46 to the power line 17. The terminal 36 is connected by a line 47 to the power line 16 at a point 48. The terminal 37 is connected by a line 49 to a point 50.

Within the control 10 the terminal 35 is connected by a line 52 to the fixed contact 32. It is also connected by a line 53 to point 54, at which point it separates first into a line 55 which leads to the clock motor winding 21, and second into a line 56 that leads to the switch blade 25. From the motor winding 21 a line 58 leads to the terminal 36. From the switch blade 24 a line 59 leads to the terminal 37, from which point there also extends a line 61 to the contact 28. It is thus clear that the main circuit of control 10 includes the time-controlled circuit of switch blades 24 and 25, and the relay circuit of contacts 28 and 32 in parallel. The clock motor coil 21 is also constantly across the line.

From the subsidiary terminal 38 there leads a line 65 to the terminal 42, having a branch 66 leading to the contact 29.

From the terminal 39 there leads a line 67 to the coil 31, and from this coil 31 a line 68 leads to the terminal 43.

From the terminal 40 there leads a line 69 to the thermostat terminal 41. From this terminal 41 there also leads a line 70 to the contact 33.

It will be seen that the subsidiary circuits within the control 10 include principally two circuits, one including the coil 31, and the other including the contacts 29 and 33.

The thermostat 11 includes a pair of thermal elements 75 and 76. The thermal element 75 has a switch 77 that is closed by the effect of rise in temperature upon the element 75. The thermal element 76 has a switch 78 that is opened by the effect of rise in temperature upon the element 76.

Each thermal element is provided with a magnet 79 with the double armature 80 that gives a snap-action both when opening and when closing. This may be of the type described in Patent No. 2,180,018, issued November 14, 1939 to Lawrence M. Persons.

The two thermal elements 75 and 76 are connected by a common lead 83 having a junction point 84 from which an external line 85 extends to the thermostat terminal 41 of the control 10. From the contact 77 a line 86 extends to the thermostat terminal 43; and from the contact 78 a line 87 extends to the terminal 42.

The stoker motor 12 has a line 90 connected to the point 50 and a line 91 connected at a point 48 to the power line 16.

The transformer 13 has its primary connection by lines 92 and 93 to the power lines 16 and 17, respectively. From its secondary there lead lines 94 and 95. The line 94 extends to a point 96 from which a first branch 97 extends to the terminal 39 of the control unit 10, and a second branch 98 extends to the modulator motor 14. The lead 95 passes directly to the modulator motor.

The modulator motor itself is of such a type that it rotates in a single direction 180° upon connection through one circuit, and rotates an additional 180° upon return to the first connection. To this end it has two main terminals 102 and 103. The line 95 is connected to the former and the line 98 to the latter. The terminal 102 is connected with a third terminal 104. There is also provided a fourth terminal 105.

A line 106 connects the terminal 104 to the secondary terminal 40 of the main control 10 and a line 107 connects the terminal 105 to the terminal 38.

A relay coil 110 is connected across between the terminals 103 and 105. To this end, a line 111 leads from the terminal 103 to the coil 110 and the line 112 leads from the coil to the terminal 105. The relay coil 110 operates a switch blade 113 which normally is in touch with the contact 114, but upon excitation of the coil the switch arm 113 shifts over to a contact 115.

There is a motor 117 to the shaft of which there is attached a commutator such as 118. The commutator has a center segment 119, a segment 120 and two segments 121 and 122, all electrically connected. Cooperating with the commutator are brushes 123, 124, 125 and 126.

From the terminal 103 a line 130 extends to the brush 125 which is always in contact with the commutator segment 119. In the position shown, the brush 124 is in contact with the segment 120. From this brush 124 a line 131 leads to the switch contact 115. The blade 113 has a line 132 leading to the brush 123 from which there also extends a line 133 to the motor 117. On the opposite side of the motor there extends a line 134 to the terminal 102.

From the contact 114 a line 135 extends to the brush 126 of the commutator.

In the position shown, the blade 113 touches the contact 114, whose circuit is open at the brush 126. However, if, upon operations subsequently to be described, the relay 110 puts the switch blade 113 in touch with the contact 115, a circuit may be traced from the terminal 103 through the line 130, the brush 125, the segment 119, the segment 120, the brush 124, the line 131, the contact 115, the blade 113, the line 132, the line 133, the motor 117, the line 134 to the terminal 102. If the two terminals 102 and 103 are across the power supply, the motor will rotate and with it will rotate the commutator 118. It may be assumed that the commutator rotates in a clockwise direction. Shortly after the rotation of the commutator begins, the segment 121 will reach the brush 123. This short-circuits the switch 113, since the motor circuit then closes from the brush 125 to the segment 119, the segment 120, the segment 121 to the brush 123 and the line 133. Shortly thereafter, under continued rotation, the segment 120 leaves the brush 124, so that its circuit through the switch 113 is open. When the rotation approaches 180°, the segment 120 will reach the brush 126 so that the circuit would then be closed from the brush 125, the segment 119, the segment 120, the brush 126 and line 135 to the contact 114. At this last point, the circuit is broken by the position of the blade 113.

Very shortly thereafter, the segment 121 will leave the brush 123, breaking the circuit of the motor, which will then stop 180° from the position at the start.

From the second position of the modulator motor, if it be assumed that the relay coil 110 be cut out, which is effected whenever circuit between the terminals 104 and 105 is broken (which, in this case, is done by external means), the blade 113 will move into touch with the contact 114. In this position, the circuit through the motor will first close from the terminal 103, the line 130, the brush 125, the segment 119, the segment 120, the brush 126, the line 135, the terminal 114, the blade 113, the line 132, the line 133, the motor 117, the line 134 and terminal 102. The motor will commence rotation and shortly after this beginning, the segment 122 will reach the brush 123, which will short-circuit the switch 113, the circuit from the brush 125 then going through the segment 119, the segment 120, the segment 122 and brush 123 to the line 133. Shortly after this action occurs, the segment 120 will move off the brush 126, breaking the circuit through the switch. The rotation will continue for 180° until the commutator returns to the first position shown in full lines, when the brush 123 leaves the commutator 122 and opens the circuit to the motor.

From the foregoing, it may be seen that the motor 117 normally is not in motion. When the terminals 104 and 105 are connected together, the relay 110 shifts the switch 113 to produce 180° rotation of the motor. This shifting may be to a position wherein an increased amount of fuel, such as coal, is supplied or made available to the stoker motor 12. When the relay 110 is released by opening the circuit between the terminals 104 and 105, the switch 113 shifts and the motor returns to its starting position, whereby the fuel supply is reduced to its original quantity.

*The operation of the thermostat 11*

As previously noted, the thermal element 75 closes upon rise in temperature; whereas the thermal element 76 opens on rise in temperature. Both elements have a differential. The range of operation, however, of the thermal element 75 is somewhat higher than that of the element 76. To illustrate, the thermal element 76 may close when the temperature falls to 69° and remain closed until the temperature rises to 70°. The thermal element 75 may close when the temperature rises to 72° and open when the temperature falls to 71°. Both thermal elements are of the snap-acting type, which is a necessity in the present combination to avoid chattering of the relays involved.

*The operation of the mechanism as a whole*

The thermostat 11 is disposed in a room or other space, the temperature of which is to be controlled. The power lines 16 and 17 are brought to the transformer leads 92 and 93 and to the control leads 46 and 47. The motor 12 is connected to the lead 49 and to the power line 16 as shown. The thermostat 11 is connected to the three thermostat terminals 41, 42 and 43 of the main control 10. The secondary leads from the transformer are connected, one to the terminal 39 of the control, and the other to the terminal 102 of the damper motor. The line 98 is connected to the terminal 103 of the damper motor. The terminal 104 is connected by the lead 106 to the terminal 40 and the terminal 105 is connected by the lead 107 to the terminal 38, both of the main control.

During normal operation, a certain minimum amount of fuel is constantly supplied to the furnace. For this purpose the motor 12 runs continuously, the circuit being closed from the power line 17, point 45, line 46, terminal 35, line 52, contact 32, contact 28, line 61, terminal 37, line 49, point 50, line 90, motor 12, line 91, point 48 and power line 16. In like manner, since the terminals 35 and 36 are directly across the power lines, the timing motor continuously runs by a circuit beginning with the terminal 35, line 53, point 54, line 55, winding 21, line 58 and terminal 36. This operation opens and closes the blades 24 and 25 at intervals, but without significance as long as the relay 26 is in the position shown.

In the event that the room cools off, because the minimum fueling operation by the motor 12 is inadequate, such as when the temperature drops down as low as 69°, the thermal element 76 will close with the contact 78. It will be remembered that the modulator motor operates 180° when the terminals 104 and 105 are connected together. Closing of the thermal element 76 so connects them, the circuit being from the terminal 104, line 106, terminal 40, line 69, terminal 41, line 85, point 84, line 83, thermal element 76, contact 78, lead 87, terminal 42, line 65, terminal 38, and line 107 to the terminal 105. This operation then closes the relay 110 and sets the modulator motor into operation which, in turn, causes increased feed to the burner. The relay 110 will be held closed and the motor 117, therefore, held in its increased heat position, so long as the thermal element 76 is closed. When the temperature rises to 70°, the thermal element 76 will open. In this event, terminals 104 and 105 of the damper motor are no longer connected together, so that the relay 110 of the modulator motor is released and the modulator motor returns to its starting position by 180° movement. The motor 12 will then continue its normal low heat operation.

It sometimes happens that the surrounding heat becomes so high that the minimum operation of the stoker motor overheats the space. If the room temperature rises to 72°, for instance, the thermal element 75 will close. This closes the circuit from the secondary line 94 to point 96, line 97, terminal 39, line 67, relay coil 31, line 68, terminal 43, line 86, contact 77, thermal element 75, line 83, point 84, line 85, terminal 41, line 69, terminal 40, line 106, terminal 104, terminal 102 to line 95 of the secondary. Closing this circuit energizes the relay coil 31 and shifts the relay bar 27 so as to disengage contacts 28 and 32 and to engage contacts 29 and 33. As soon as the relay shifts, there is a circuit formed in which the terminals 104 and 105 of the modulator motor are connected together. This circuit passes from the terminal 104, line 106, terminal 40, line 69, terminal 41, line 70, contact 33, contact 29, line 66, line 65, terminal 38 and line 107 to the terminal 105. This then causes the modulator motor 117 to move to its second position of increased fuel. However, the stoker motor 12 is cut on to intermittent operation, since its continuous circuit is broken by the contacts 28 and 32. The parallel circuit for the motor 12, however, is intermittently formed from the power line 17, point 45, line 46, terminal 35, line 53, point 54, line 56, blade 25, blade 24, line 59, terminal 37, line 49, point 50, line 90, motor 12, line 91, point 48 and power line 16.

The cams 22 and 23 separate the switch blades 24 and 25 for a substantial part of each revolution. Hence, the stoker motor 12 operates only for the relatively small period when the front cam 22 permits switch blade 24 to engage with blade 25. To illustrate, the stoker feed may be permitted only for ten to fifteen minutes out of an hour, so as to maintain a fire in the stoker.

Whenever the cam 22 permits engagement of the blades 24 and 25 with the mechanism on intermittent operation, the stoker motor 12 will start. Owing to the fact that the motor 14 is in its position of supplying a greater amount of fuel, the stoker motor will operate for its interval with a larger quantity. This is done so that there will be insured enough fuel to hold the fire between the periodical operations. In other words, the minimum fueling for constant operation might be insufficient to hold the fire during the long interval between successive intermittent operations.

The low limit control 15 is provided to prevent the water from cooling down below a certain minimum. This limit control automatically puts the stoker motor in circuit whenever a thermal element included in it closes a switch. Since it is in parallel with the switch 24 and the relay switch 26, it is independent of both.

Figure 2:
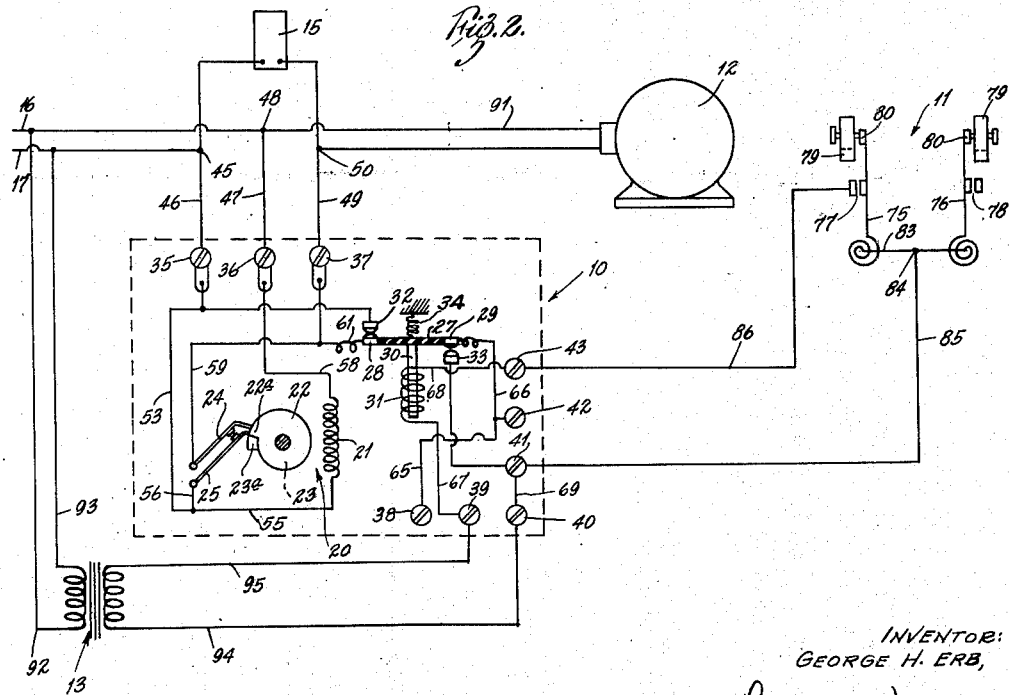
Fig. 2 is a view of the mechanism showing how it may be connected for a standard type of operation.
Figure 3:
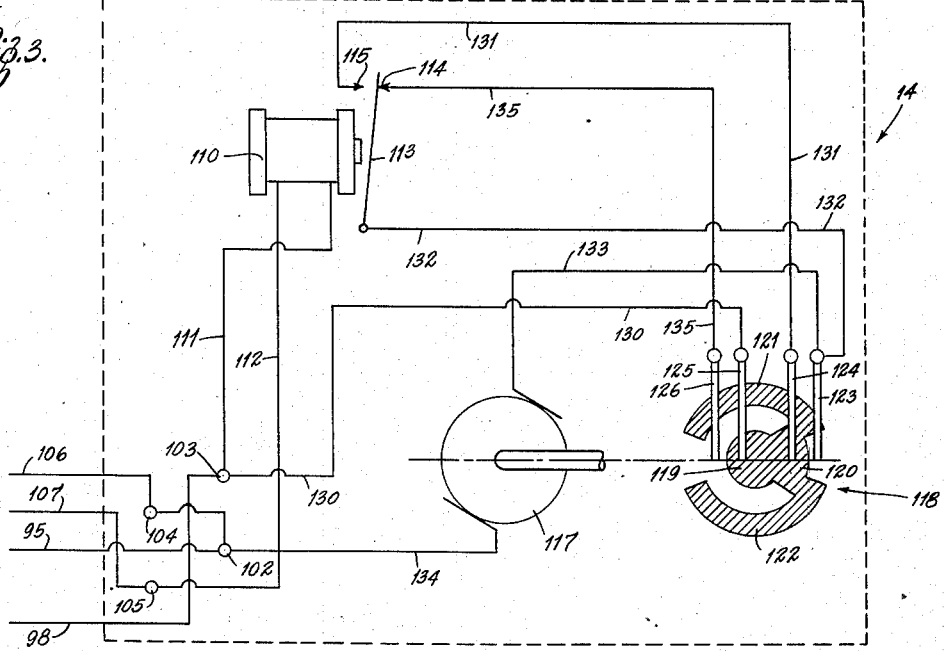
Fig. 3 is a wiring diagram of a motor for use in the arrangement of Fig. 1; and, Fig. 4 is a slightly modified type of control.

The control unit 10 and the thermostat 11 may be connected in suchwise as to be used in a normal intermittent operation set-up without the modulator motor 14. In this arrangement, the connections are as shown in Fig. 2; and the result is that the stoker motor is on intermittent operation with only the fire-holding cycle operating it when the space to be heated is adequately warm. When the temperature falls, however, the stoker motor operates until the room is heated to satisfy the thermostat.

All of the connections shown in Fig. 2 are identical with those of Fig. 1, save for the external ones at the terminals 38, 39, 40 and 42. Hence, the stoker motor will operate when the relay switch bar 27 is in its outer position, and will operate intermittently under control of the cams 22 and 23 for fire-holding purposes when the relay bar 27 is in its lower position.

To this end, the leads 94 and 95 of the transformer 13 are brought to the terminals 40 and 39 of the control 10. The connections at 41 and 43 are unchanged. The external connections from 38 and 42 are omitted. Thus, the thermal element 75, which closes on rise of temperature, is in circuit but the other thermal element 76 is not.

When the room is at its desired temperature, the stoker motor is on intermittent operation. For this, the relay switch bar 27 is in its lower position, caused by energization of its coil 31 through the following circuit, it being remembered that, since the room is warm, the thermostat 75 is closed, it closing on rise in temperature: from the transformer 13, the circuit includes the lead 94, terminal 40, line 69, terminal 41, line 85, point 84, line 83, thermal element 75, contact 77, line 86, terminal 43, line 68, coil 31, line 67, terminal 39 and line 95.

In this position, the stoker motor 12 is caused to operate by the intermittent closing of the switch blades 24 and 25 under action of the cams 23 and 22, and the operation takes place with sufficient frequency to insure holding of the fire.

Should the room become cold, the thermal element 75 will open, breaking the circuit through the coil 31, and permitting the relay switch bar 27 to return to its upper position in which the stoker motor runs continuously to feed the fire until the room is heated again to the desired temperature.

Figure 4:
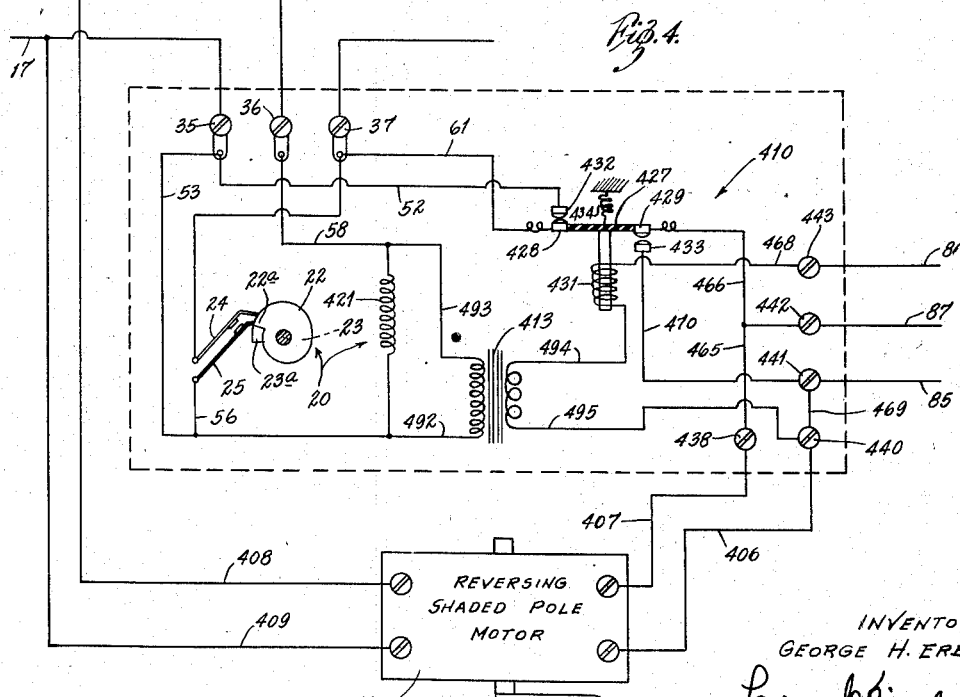

In the modification of Fig. 4, the transformer is made a part of the control unit, which is employed with a different type of regulating or modulating motor. There is the unit 410, the transformer 413, here a part of the unit 410, and a modulating motor 414.

The main circuit of the unit 410 is identical, save for the changes necessitated by inclusion of the transformer 413. The primary of the transformer is connected across the constantly energized timing motor coil 421 by leads 492 and 493. The secondary has a lead 494 extending directly to the relay coil 431, and a second lead 495 passing to the terminal 440.

The motor in this case is the reversing shaded pole type, known in the art, wherein there are two shaded pole windings, one for each direction of rotation, and one producing greater torque than the other. The weaker winding is constantly shorted so that the armature is constantly biased in the direction of that winding. The stronger is normally open, producing no torque, but, when closed, it overbiases the weaker winding and produces a torque moving the motor in the opposite direction.

This motor 414 has line connections 408 and 409 for its main winding. It has a lead 407 to the terminal 438 and a lead 406 to the terminal 440, these controlling the high torque pole winding.

When the circuit is in initial position, the modulating motor 414 is stopped in position of low fuel feed, in which position it remains as long as the room temperature is above the closing value of the low range thermal element 76. When the thermal element 76 closes upon decrease in room temperature, lines 85 and 87 are closed together, which shorts the high torque pole windings of the motor by the following: Line 85, terminal 441, line 469, terminal 440, line 406, motor 414, line 407, terminal 438, line 465, terminal 442, line 87. This causes rotation of the motor to its second position, giving increased fuel supply; and this position will be retained until the thermostat 76 opens, at which time the low torque pole winding will return the motor 414 to original position.

Also, upon rise in heat to the high range, so that thermal element 75 closes contact 77, the lines 85 and 86 are closed together. This energizes the coil 431 from the transformer as follows: line 85, terminal 441, line 469, terminal 440, line 495, transformer 413, line 494, coil 431, line 468, terminal 443 and line 86. This, by shifting the bar 427, puts the main stoker motor 12 on intermittent operation, and shifts the modulating motor to high feed operation by short-circuiting the high torque pole winding as follows: contact 433, line 470, terminal 441, line 469, terminal 440, line 406, motor 414, line 407, terminal 438, line 465, line 466, and contact 429. Thus, the switch contacts 429 and 433 are in parallel with the thermal unit 76. Opening of the thermal element 75 returns the motor 414 to initial low feed position by release of the coil 431, which also puts the motor 12 back on continuous operation.

In this mechanism, the thermal elements 75 and 76 are of the adjustable type, such as shown in Lawrence M. Persons application Serial No. 79,052.

What is claimed is:

1. In a method of producing heat changes in a given space by a solid fuel device, the steps of effecting a first range of operation by causing a heat change producing device normally to function continuously to provide a predetermined minimum of heat change in the space, increasing the degree of said continuous operation if the amount of heat change in said space is inadequate, and effecting a second range of operation when the heat change produced in said space by the minimum continuous operation is excessive by causing said heat change producing device to operate only intermittently.

2. In a method of automatically producing heat changes in a given space, the steps of effecting a first range of operation by causing a heat change producing device normally to function continuously at a predetermined minimum rate to provide a desired minimum of heat change within the space, automatically increasing the rate of functioning of the heat change producing device if the minimum rate is inadequate, and effecting a second range of operation when the heat change produced by the minimum continuous operation is excessive by causing the heat change producing device to operate only intermittently, but causing it to function at its increased rate during each intermittent operation.

3. In a system of the kind described, heat change producing means operable at variable heat change producing rates, and a control mechanism to determine whether the means operates continuously or intermittently and at a high rate or low rate, said control mechanism including temperature-responsive means having first combinations adapted to cause the heat change producing means to operate continuously at a minimum rate for one temperature condition in said space, and having second combinations adapted to cause the same to operate at an increased rate for a second temperature condition in said space, said temperature-responsive means also including third combinations to cause the heat change producing means to operate only intermittently when a third temperature condition exists in said space, regardless of the condition of the first or second combinations.

4. In a system of the kind described, heat change producing means, and means to vary the amount of heat change produced by said means, a first and time-controlled circuit for operating the heat change producing means intermittently, a second circuit for operating the said means continuously, and control means to preselect which circuit is effective, and to cause the variation in the varying means, said control means including a thermostat movable through three successive positions for progressively increased heat changes, means actuated by said thermostat in its first position adapted to select the second circuit for operation, means actuated by said thermostat in its second position to vary the heat change amount means position, and means actuated by the thermostat in its third position to select the first circuit, said last-named means being also adapted to operate the heat change amount means to the same position as that produced by the thermostat in its second position.

5. In a system of the kind described, a variably operable heat change producing means, means to cause same to operate continuously at a given rate, means to cause same to operate continuously at an increased rate, and means to cause the same to operate intermittently at the increased rate, said last three means including thermally-responsive mechanisms effecting said three operations at different temperatures.

6. In a system of the kind described, heat change producing means, means to vary the amount of heat change produced thereby, a main control to control the energization of said heat change producing means, and having a pair of parallel circuits through either of which the energization may be effected, a relay switch in the first circuit, a time-controlled switch in the other, space thermostat means adapted to shift from a starting position to two successive temperature changes, the relay switch being closed in the first position, a circuit closed in the second position to actuate the means to vary heat change produced, a circuit closed by the thermostat means in its third position to open the relay switch, and a circuit closed upon opening of the relay switch to actuate the means to vary the heat change produced.

7. In a system of the kind described, a heat change producing means, means to vary the quantity of heat produced thereby including a motor adapted successively to rotate a predetermined angular distance and stop, a first main circuit through the heat change means, a relay switch therein, a second main circuit for the heat change means, a time-controlled switch therein, thermostat means including two snap-acting thermostats each movable to two positions, a first circuit through the motor adapted to be closed only when both thermostats are open, a second circuit through the motor adapted to be closed when the first thermostat closes, whereby the quantity of heat change may be increased by shifting of said motor to second position, the first thermostat being adapted to open when the increased heat change is effective upon it, the first circuit of the motor being closed when said second thermostat opens, and a third circuit closed when the second thermostat closes, which occurs upon excess heat change, said third circuit opening the relay in the first main circuit, and closing a circuit through the motor to shift it to second position.

8. In a system of the kind described, a pair of thermostatic devices, each movable to a plurality of positions, parallel circuits, one including each thermostatic device, a heat-change producing device, two circuits therefor, one to produce continuous operation thereof and the other to produce intermittent operation, means to vary the heat-change producing capacity of the heat-change producing device, one of said parallel circuits being adapted to operate said varying means upon movement of its thermostat, the other of said circuits including means to select either the continuous or the intermittent circuit for the heat-change producing device upon movement of its thermostat.

9. In a system of the kind described, a pair of thermostatic devices, each movable to a plurality of positions, parallel circuits, one through each thermostatic device, a heat-change producing device, two circuits therefor, one to produce continuous operation thereof and the other to produce intermittent operation, means to vary the heat-change producing capacity of the heat-change producing device, one of said parallel circuits being adapted to operate said varying means upon movement of its thermostat, the other of said circuits including means to select either the continuous or the intermittent circuit for the heat-change producing device upon movement of its thermostat, together with means to cause said varying means to operate to a predetermined one of its conditions upon operation of said second thermostat to select the intermittent circuit for the heat-change producing device.

10. In a system of the kind described, a pair of thermostats, switches thereon, the first thermostat being adapted to close its switch upon rise of temperature, the second to close upon fall of temperature, parallel circuits, one through each of said switches, a heat-change producing device, means for varying the heat change producing capacity of said heat-change producing device, two circuits for the heat-change device, one to produce intermittent operation thereof, one to produce continuous operation thereof, said first thermostat circuit including means to select the intermittent circuit upon closing, and the second thermostat being adapted to cause increased operation by the varying means upon closing.

11. In a system of the kind described, a pair of thermostats, switches thereon, the first thermostat being adapted to close its switch upon rise of temperature, the second to close upon fall of emperature, parallel circuits, one through each of said switches, a heat-change producing device, means for varying the heat change producing capacity of said heat-change producing device, two circuits for the heat-change device, one to produce intermittent operation thereof, one to produce continuous operation thereof, said first thermostat circuit including means to select the intermittent circuit upon closing, and the second thermostat being adapted to cause increased operation by the varying means upon closing, together with snap-action means for each thermostatic switch.

12. In a control mechanism including first and second circuits adapted to be connected with a heat-change producing device, a first set of relay switch contacts in the first said circuit, relay operating means, a pair of leads for the relay operating means, a second set of relay switch contacts also operated by the relay operating means when the same is in condition opposite that in which the first set of relay switch contacts is operated, leads for said second relay switch contacts, first and second terminals for the leads of the relay operating means, third and fourth terminals for the second set of relay switch contact leads, whereby upon connecting terminals one and four to power lines, and two and four through a first external control, the relay may be operated by the first external control, and whereby additionally terminals three and four may be connected through another external control, so that terminals three and four may be shunted by said second external control, and when the first external control operates to operate the relay, the terminals three and four may be shunted through the second relay switch.

13. In a system of the kind described, a power supply, an electrically operated heat change device and a main control therefor, adapted for use with an external control device and an actuatable means, said main control having a first group of circuits and a second group of circuits, a relay device interrelating said groups, the relay device being operable into a first and a second position to close a first or a second relay switch, the first group of circuits comprising two parallel circuits including the heat change device, a time-controlled switch in one circuit, and the first relay switch being in the second circuit, whereby the heat change device may be operated whenever either the time-controlled switch or the first relay switch is closed, the second group of circuits including a relay coil and terminals therefor, adapted for connection with the external control device and the power supply, whereby the relay coil may be energized, the first relay switch opened and the second relay switch closed by the external control device, and terminals for the second relay switch adapted to be connected with the actuatable means, whereby when said relay coil is energized and the second relay switch is closed, the actuatable means may be energized, and by virtue of the opening of the first relay switch, the heat change device may not be operated through the said first relay switch and its circuit.

14. In a heat regulating mechanism to be used in conjunction with equipment for heating an area requiring the production of heat in three temperature ranges, a burner means, means to supply one fuel ingredient to the burner in a relatively small amount and in a relatively large amount, means for operating the burner means and the supply means in its large amount to effect periodic increases in the production of heat in the highest of these ranges, means for operating the burner means and the supply means in its small amount to effect production of a constant flow of heat in the middle of these ranges, and means to operate the burner means and the supply means in its higher amount for producing additional heat to satisfy the requirements of the lowest of these heat ranges.

GEORGE H. ERB.